J. TETLOW.
Cotton Gin.
No. 20,904.
Patented July 13, 1858.
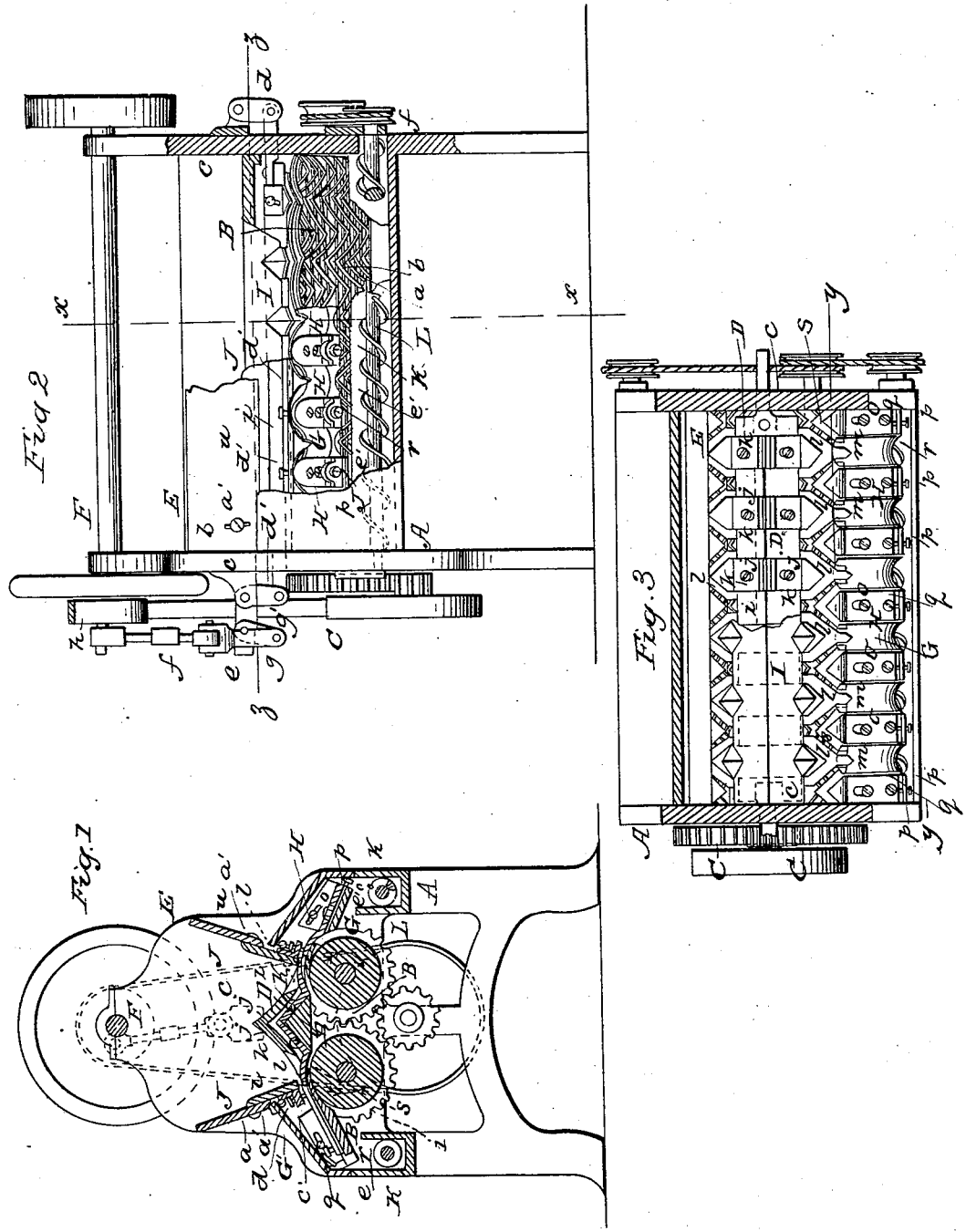

UNITED STATES PATENT OFFICE.

J. TETLOW, OF TAUNTON, MASSACHUSETTS.

IMPROVEMENT IN COTTON-GINS.

Specification forming part of Letters Patent No. 20,904, dated July 13, 1858.

*To all whom it may concern:*

Be it known that I, JOSHUA TETLOW, of Taunton, in the county of Bristol and State of Massachusetts, have invented a new and Improved Cotton-Gin; and I do hereby declare that the following is a full, clear, and exact description of the same, reference being had to the annexed drawings, making a part of this specification, in which—

Figure 1 is a transverse vertical section of my improvement, taken in the line $x\ x$, Fig. 2. Fig. 2 is a side sectional elevation of same, taken in different planes, as indicated by the bent line $y\ y$, Fig. 3. Fig. 3 is a horizontal section of same, taken in the line $z\ z$, Fig. 2.

Similar letters of reference indicate corresponding parts in the several figures.

This invention relates to an improvement in roller-gins, such as are used for ginning Sea Island or other long-staple cotton, and is designed to expedite the ginning of long-staple cotton, and at the same time perform the work in a thorough manner without injuring in the least the fiber.

The invention consists in the employment or use of grooved rollers—one or more—in connection with stationary and vibrating plates arranged so as to operate and effect the desired result, as hereinafter fully shown and described.

To enable others skilled in the art to fully understand and construct my invention, I will proceed to describe it.

A represents a frame, in the upper part of which two rollers, B B, are placed longitudinally, and connected at one end by gear-wheels C C. The rollers are parallel with each other, but not in contact, and each roller is grooved longitudinally and parallelly with its shaft, as shown at $a$, and also grooved in a zigzag manner, as shown at $b\ b'$. (See Fig. 2.)

D represents a three-sided bar, which is placed above the rollers B B, and directly over the center of the space between them. The ends of the bar D pass through the ends $c$ of a box or hopper, E, and are attached to swinging pendants $d\ d'$, attached to the outer sides of the ends $c$. (See Fig. 2.) The pendant $d'$ has an arm, $e$, projecting from its upper end at right angles, and a connecting-rod, $f$, is attached to said arm $e$ by a strap, $g$, and arm or lever $g'$, the connecting-rod being attached at its upper end to a crank-pulley, $h$, which is at one end of the driving-shaft F, said shaft being fitted in suitable bearings on the upper part of the box or hopper E. The bar D is so placed relatively with the rollers B B that the sides $i$ form obtuse angles with the rollers B, (see Fig. 1,) and to each side $i$ a series of adjustable bars, $j$, are attached by set-screws $k$, said bars being curved at their lower ends, and having a series of plates, $l$, attached to them, said plates having oblique sides and their lower ends terminating in pointed projections $m$, having parallel sides, as shown in Fig. 3. The plates $l$ are curved to correspond with the curvature of the roller B B, as shown clearly in Fig. 1.

G G represent two inclined plates, which are attached one to each side of the frame A on its upper part. These plates extend the whole length of the frame A, and have grooves made in them transversely to receive bars H, which are secured in the grooves by set-screws $o$, and are rendered adjustable by screws $p\ q$, the screws $p$ through ledges $r$ at the ends of the plates and bearing against the lower edges of the bars and the screws $q$ passing through the outer ends of the bars at right angles and bearing against the plates G. (See Fig. 1.) The upper ends of the bars H are pointed, and each has a plate, $s$, attached. The plates $s$ are of triangular form, and they are of slightly concave form on their under sides, so that the edges of the plates may be quite close to the rollers B B and the central parts elevated from it, as shown at $t$, Fig. 1. The plates $l$ are slightly elevated from the rollers B, so that their edges may work a short distance over the edges of the plates $s$. The bar D and its short bars $j$ are covered by a guard, I, which is secured in the seed box or hopper directly over bar D and a short distance above it. The sides J J of the hopper or seed-box are each formed of two parts, $u\ v$, the lower parts, $v$, being attached to the upper parts, $u$, by set-screws $a'$, which pass through oblong slots $b'$ in the parts $u$, and permit the lower parts, $v$, to be adjusted higher or lower, as may be desired. The lower parts of the parts $v$ of the sides J have projections or flanges $c'$ at right angles with their other portions, and screws $d'$ pass through these projections or flanges, said screws bearing on the inner parts of the bars H. (See Figs. 1 and 2.)

At each side of the frame A a longitudinal box or trough, K, is placed, and a shaft, L, is fitted in each box or trough, said shaft having spiral flanges $e'$ formed on them. At one end of these boxes or troughs a discharge-opening, $f'$, is made.

The operation is as follows: The cotton to be ginned is placed within the box or hopper E, and motion is given the shaft F by any proper means. The rollers B B rotate in the direction indicated by arrows 1, Fig. 1, and the cotton is drawn by the rollers B B underneath the plates $s$, and while thus being drawn underneath said plates is acted upon by the plates $l$ of the bars $j$, said plates having a vibratory movement given them by the crank-pulley $p$, rod $f$, pendant $d'$, with arm $e$ attached, and detaching the seeds from the cotton. This operation is greatly facilitated by the zigzag grooves, the parts $b\ b'$ of which act in such a manner as to draw the fiber of the cotton toward the edges of the plates $s$, and the seed is effectually rippled out by the plates $l$ and passes down the plates G into the boxes K, and is conveyed out at one end thereof by the screw-shafts L. The feed of the cotton to the rollers B B is regulated by adjusting the parts $v$ of the sides J, so that the space between the lower edges $v$ and the plates $s$ may be increased or diminished, as desired. The parts $m$ project beyond the lower edges of the parts $v$, and serve to act fully upon the portion of cotton that may project through said spaces while being drawn between the plates $s$ and the rollers B. The plates $s$ being adjusted by the screws $p\ q\ o$ as occasion may require.

By employing two rollers the machine is made to perform considerable work within a given time, for the parts are such that the double arrangement may be adopted without rendering it complex. The machine, however, works far more rapidly than the ordinary gins, and the fiber is not injured or broken in the least.

I would remark that I do not confine myself to any particular material. The plates $s\ l$ may be of sheet metal. The bars $j$ H are of metal. The rollers B B may be of hard wood or metal. I would also remark that the plates G are covered by guard-plates $G'$.

Having thus described my invention, what I claim as new, and desire to secure by Letters Patent, is—

The rollers B B, one or more, grooved as shown—viz., longitudinally and parallelly with their shafts, and grooved also in a zigzag manner—in connection with the adjustable stationary plates $s$ and vibrating plates $l$, arranged to operate as and for the purpose set forth.

JOSHUA TETLOW.

Witnesses:
EDWIN TETLOW,
C. I. NEW.